United States Patent
Truluck

(10) Patent No.: US 10,029,769 B2
(45) Date of Patent: Jul. 24, 2018

(54) SYSTEM AND METHOD FOR COMMUNICATING NEAR-REAL TIME MARINE NAVIGATION INFORMATION

(71) Applicant: Spatial Engineering, Inc., Rincon, GA (US)

(72) Inventor: Richard L. Truluck, Rincon, GA (US)

(73) Assignee: Spatial Engineering, Inc., Rincon, GA (US)

( * ) Notice: Subject to any disclaimer, the term of this patent is extended or adjusted under 35 U.S.C. 154(b) by 0 days.

(21) Appl. No.: 14/533,912

(22) Filed: Nov. 5, 2014

(65) Prior Publication Data
US 2016/0123737 A1  May 5, 2016

(51) Int. Cl.
| | |
|---|---|
| *B63B 49/00* | (2006.01) |
| *G01C 21/00* | (2006.01) |
| *G01B 21/18* | (2006.01) |
| *G01C 21/20* | (2006.01) |
| *G01C 13/00* | (2006.01) |

(52) U.S. Cl.
CPC ............ *B63B 49/00* (2013.01); *G01C 21/005* (2013.01); *G01B 21/18* (2013.01); *G01C 13/008* (2013.01); *G01C 21/20* (2013.01)

(58) Field of Classification Search
CPC ....... G01C 13/008; G01C 21/20; G01B 21/18
USPC ...................... 701/425, 429, 409; 702/2, 166
See application file for complete search history.

(56) References Cited

U.S. PATENT DOCUMENTS

| | | | | |
|---|---|---|---|---|
| 5,933,110 A * | 8/1999 | Tang | ...................... | G01S 19/55 342/357.37 |
| 6,256,585 B1 * | 7/2001 | Shannon | .............. | G01C 13/008 702/2 |
| 6,321,158 B1 * | 11/2001 | DeLorme | .............. | G01C 21/26 340/995.16 |
| 6,865,476 B1 * | 3/2005 | Jokerst, Sr. | ............ | G01C 21/20 701/467 |
| 8,265,866 B2 * | 9/2012 | Altamura | ............... | G01C 21/20 701/409 |
| 8,463,458 B2 * | 6/2013 | Wood | ..................... | G01C 21/00 701/2 |
| 8,645,012 B2 * | 2/2014 | Salmon | ................ | G05D 1/0206 701/21 |
| 9,002,637 B2 * | 4/2015 | Tognoni | ............... | G01C 21/203 701/409 |
| 2009/0112510 A1 * | 4/2009 | Crane | .................... | G01B 21/18 702/166 |

* cited by examiner

*Primary Examiner* — Thomas G Black
*Assistant Examiner* — Wae L Louie
(74) *Attorney, Agent, or Firm* — Clements Bernard Walker PLLC; Christopher L. Bernard; Richard A. Walker

(57) ABSTRACT

A system for providing near real time navigation information includes a first communication device configured to transmit collection vessel data representing collection vessel draft and a geoposition. It also includes a second communication device configured to transmit user vessel data, including user vessel draft and user geoposition. A processing device is configured to determine a keel verified depth (KVD) based upon the collection vessel depth for the geoposition and transmit that data to the second communication device.

4 Claims, 8 Drawing Sheets

SYSTEM AND METHOD FOR COMMUNICATING NEAR-REAL TIME MARINE NAVIGATION INFORMATION

BACKGROUND

Field

The present disclosure relates generally to the field of maritime navigation. More particularly, it relates to a system for providing maritime navigation information.

Description of the Problem and Related Art

The Intracoastal Waterway (ICW) is a 3,000-mile (4,800 km) inland waterway along the Atlantic and Gulf coasts of the United States. Some sections of the waterway consist of natural inlets, saltwater rivers, bays, and sounds, while others are man-made canals. It provides a navigable route along its length without many of the hazards of travel on the open sea.

The ICW runs for most of the length of the eastern seaboard, from its unofficial northern terminus at the Manasquan River in New Jersey, where it connects with the Atlantic Ocean at the Manasquan Inlet, then around the Gulf of Mexico to Brownsville, Tex. The waterway consists of three non-contiguous segments: the Gulf Intracoastal Water, extending from Brownsville, Tex., east to Carrabelle, Fla.; a second section of the Gulf ICW, beginning at Tarpon Springs, Fla., and extending south to Fort Myers, Fla.; and the Atlantic ICW, extending from Key West, Fla., to Norfolk, Va. (milepost 0.0). These segments were intended to be connected via a dredged waterway from St. Marks, Fla. to Tarpon Springs and the Cross Florida Barge Canal across northern Florida, but these projects were never completed due to environmental concerns. Additional canals and bays extend a navigable waterway to Boston, Mass.

The ICW has a good deal of commercial activity; barges hauled petroleum, petroleum products, food stuffs, building materials, and manufactured goods. It is also used extensively by recreational boaters. On the east coast, some of the traffic in fall and spring is by transient boat owners who regularly move their vessel south in winter and north in summer. The waterway is also used when the ocean is too rough for travel. Numerous inlets connect the Atlantic and the Gulf of Mexico with the ICW.

The ICW connects to several navigable rivers where shipping traffic can travel to inland ports, including the Mississippi, Alabama, Savannah, James, Susquehanna, Delaware, Hudson, and Connecticut rivers.

Since 1824, the US Army Corps of Engineers has had the responsibility of maintaining the ICW. Today, federal law provides for the waterway to be maintained at a minimum depth of 12 feet Mean Low Water (MLW) (3.7 m) for most of its length.

Inadequate funding has either prevented maintenance of the ICW or caused it to be "crisis focused" maintenance only. Consequently, for larger vessels, shoaling or shallow waters are encountered along several sections of the waterway, with these having 7-feet (2.1 m) or 9-feet (2.7 m) minimum depths from earlier improvements. Navigation information using National Oceanic and Atmospheric Administration (NOAA) Navigation Charts is highly suspect because the data is typically years out of date; FOIA hydrographic surveys (if available) are difficult to obtain and use for the typical boater; and institutional knowledge (senior boat captains/experienced ICW users) is limited and not well publicized. As a result, dependable information about channel location, alignment, depth, shoaling, and usability is challenging to obtain and suspect to use.

What is needed is a system and method for communicating waterway channel location and depth based on known marine traffic/use as determined by vessel keel depth, location, time, and tidal information (KVD) from deep draft vessels including tug boats, barges, sail boats, and other water craft.

BRIEF DESCRIPTION OF THE DRAWINGS

The system and method is described with reference to the accompanying drawings. In the drawings, like reference numbers indicate identical or functionally similar elements.

DETAILED DESCRIPTION

Figure 1:
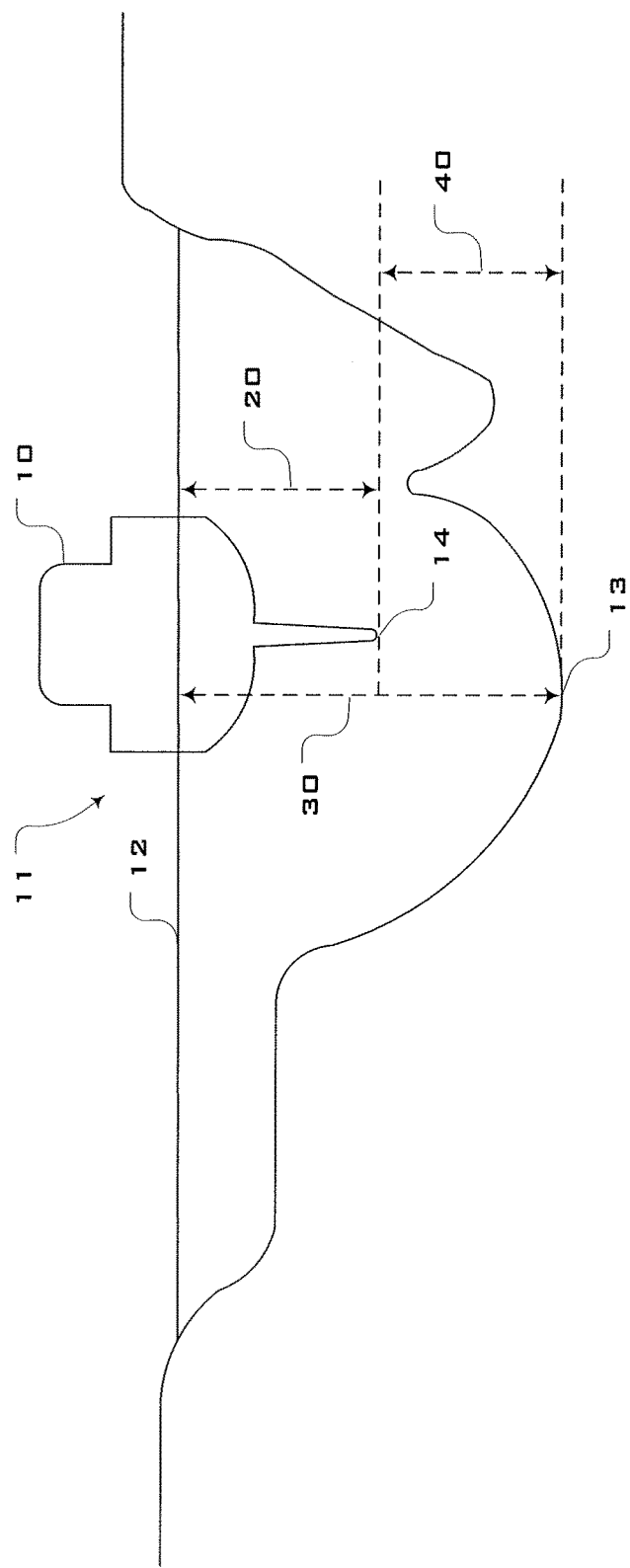
FIG. 1 illustrates a vessel underway in a waterway.

The various embodiments of the system and method and their advantages are best understood by referring to FIGS. 1 through 8 of the drawings. The elements of the drawings are not necessarily to scale, emphasis instead being placed upon clearly illustrating the novel features and principles of operation. Throughout the drawings, like numerals are used for like and corresponding parts of the various drawings.

Furthermore, reference in the specification to "an embodiment," "one embodiment," "various embodiments," or any variant thereof means that a particular feature or aspect described in conjunction with the particular embodiment is included in at least one embodiment. Thus, the appearance of the phrases "in one embodiment," "in another embodiment," or variations thereof in various places throughout the specification are not necessarily all referring to its respective embodiment.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing", "forwarding", "receiving", "performing", "comparing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed system also relates to apparatuses for performing the operations herein. These apparatuses may be specially constructed for the required purposes, or may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

Referring first to FIG. 1, a water craft 10 is illustrated underway in the waterway channel 11. The depth from the water surface 12 to the lowest point 14 of the craft 10 is referred to herein as the "actual draft" ("AD") 20. The depth from the water surface 12 to the bottom 13 of the channel is referred to as the "channel depth" ("CD") 30. The difference between AD and CD is referred to as "excess over depth" ("EOD") 40.

Figure 2:
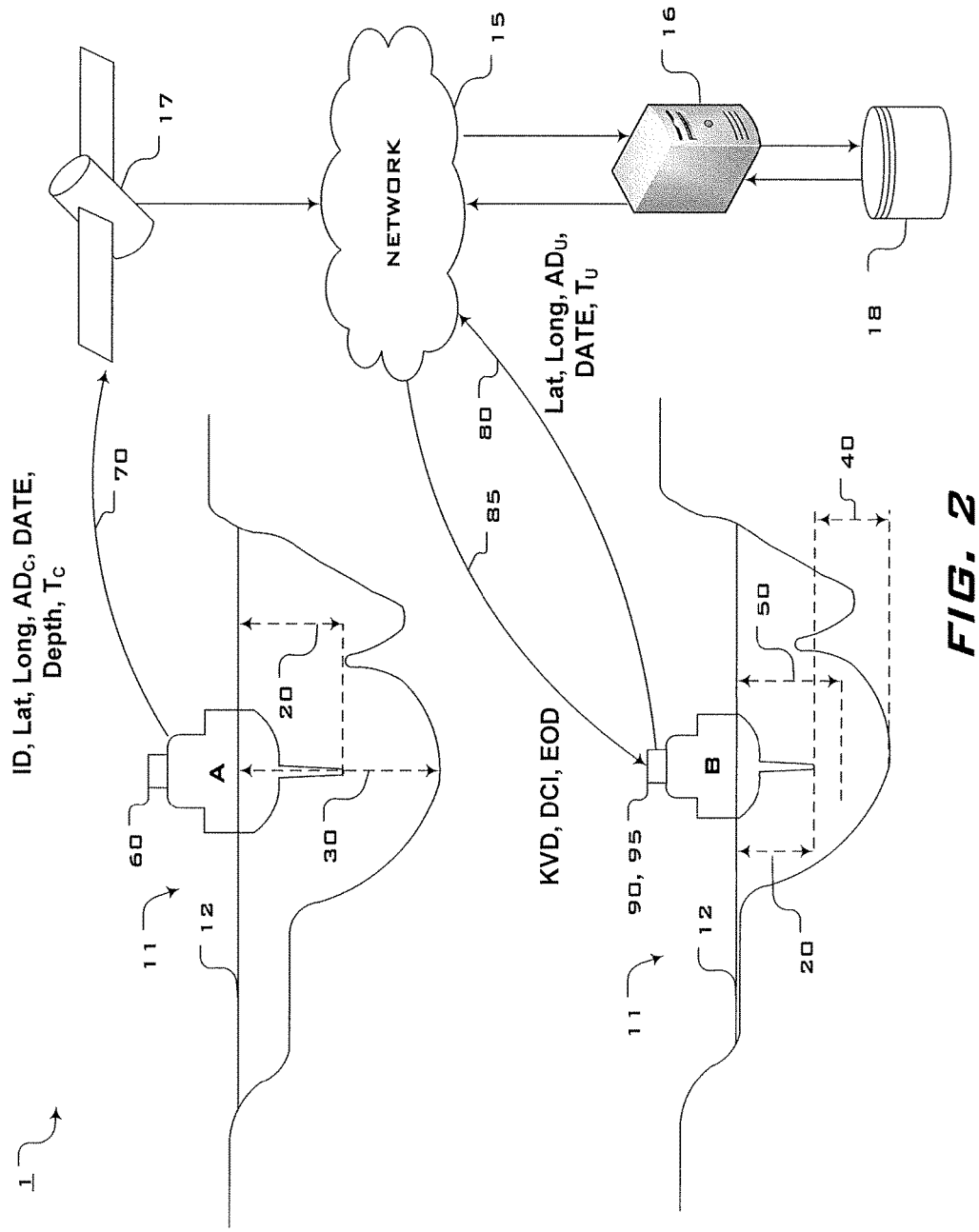
FIG. 2 depicts an exemplary embodiment of a system for communicating near-real time marine navigation information.

FIG. 2 illustrates an exemplary embodiment of the system 1 comprising a collecting vessel A underway in the waterway channel 11 having CD 30. Collecting vessel A exhibits an AD 20. Collecting vessel A includes a data transmitter 60 configured to transmit a data signal 70 to a communications network 15, which may include a communications satellite 17, the data comprising collecting vessel identification, and geographic position of the collecting vessel A, the date, time of collection, $T_C$, and collecting vessel's AD, $AD_C$. Optionally, if the collecting vessel A is equipped with depth-finding equipment, the data signal may also comprise a measured channel depth 30.

A user vessel B includes a transmitter 90 in communication with the server 16 through the network 15. The transmitter 90 is configured to send a data signal 80 to the server 16, the data comprising a geographic position user vessel B, the date, the user's local time ($T_U$), and the user vessel's AD 20, $AD_U$. The user vessel B is equipped with a receiver 95 configured to communicate with the network 15 and receive a data signal 85 that includes keel-verified depth ("KVD") data. KVD is the maximum $AD_C$ recorded for location x, y at $T_C$, and represents a maximum safe depth for location x, y under the tidal conditions occurring at $T_C$. The data signal may also comprise depth confidence indicator ("DCI") data, described in greater detail below, which provides an indication of the comparison of KVD against the tide, or predicted tide, for location x, y at $T_U$. In an alternative embodiment, the received data signal 85 could include EOD 40 data.

The system 1 further comprises a computer-based server 16 in communication with the network 15. Server 16 may also be in communication with a computer-based database 18. The server 16 is configured with a computer memory for storing software adapted to cause the server to execute the processes described hereafter. Server 16 may provide one or more services (e.g., database services, systems management services, network monitoring services, transactional services, webpage viewing services, etc.). Server 16 may be a front end server (e.g., that provides an interface to a client) and/or a back end server. Through the server 16, users may request data, initiate actions, receive information, etc.

Database 18 is configured with a data structure that stores collector vessel A data, including vessel identification, vessel AD 20, date, $T_C$, collecting vessel A geographic position at $T_C$, and, optionally, depth 30 at the geographic position. The database 18 is also configured to store user vessel B AD 20, $T_U$, and the user vessel geographic position at $T_U$. The database may also store data regarding tides at relevant geographic positions. This data may be obtained from, for example, the National Oceanic and Atmospheric Administration.

Figure 3:
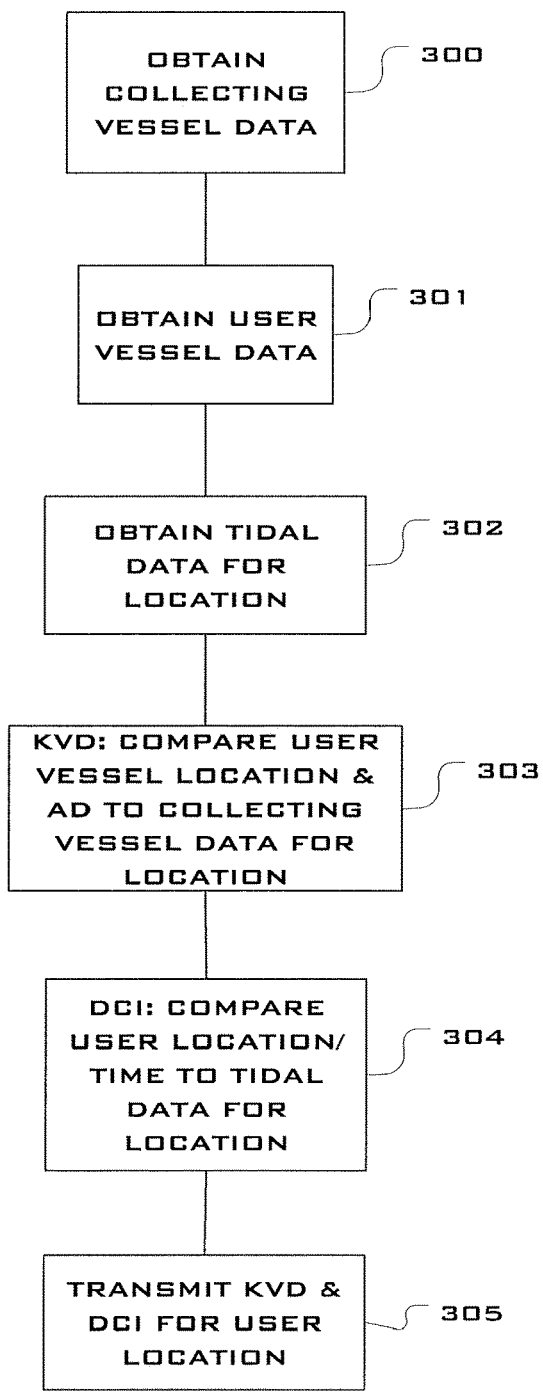
FIG. 3 is a flow chart of an exemplary process performed by the system depicted in FIG. 2.

A process performed by the system 1 is depicted in FIG. 3. The system 1 first obtains collecting vessel A data 300, then obtains user vessel B data at step 301. Tidal data for the relevant location is obtained at step 302. At step 303, KVD is determined where user AD 20 and location data are compared to the AD 20 of the collecting vessel for that location. Next, the user vessel B location and $T_U$ is compared to tidal data for that location and time to generate DCI 304. Finally, KVD and DCI are sent to the user vessel B. KVD is an indication that for a given location, a vessel of a certain AD 20 previously traversed the waterway. DCI, described in greater detail hereafter, provides an indication of the confidence of the KVD considering $T_U$ and the local tide.

Figure 4:
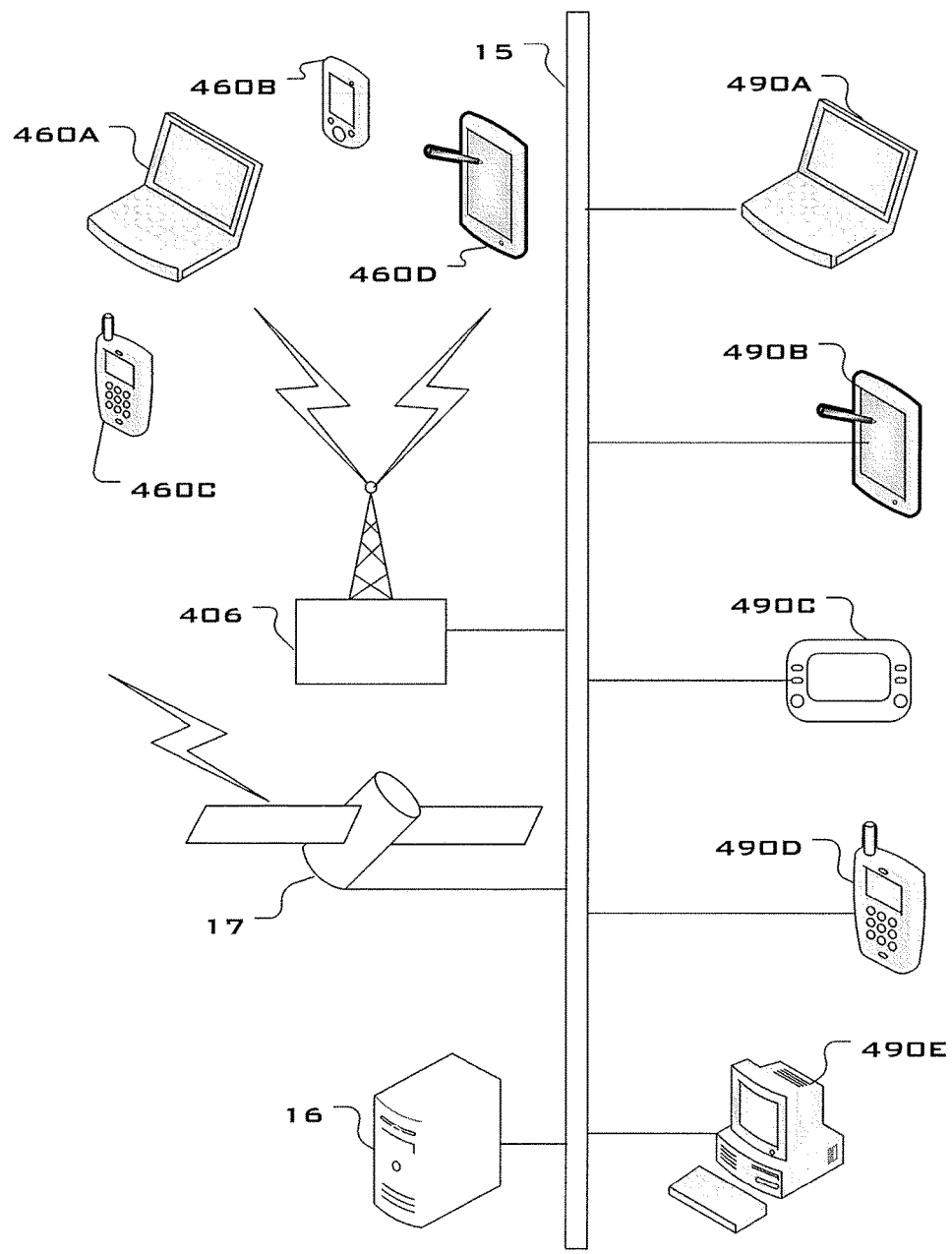
FIG. 4 is a diagram of the system according to one exemplary embodiment of the system.

Another example embodiment of the system is depicted in FIG. 4, the system comprising one or more remote computer-based communications devices 460A-D that are deployed aboard one or more collecting vessels A. The collecting vessel communications device 460 is configured with a user interface and software to allow input into the device of collecting vessel A data described above and with a communication module to permit at least transmission of collecting vessel data. Input of the data may be manual. Optionally, the collecting vessel communications device 460A-D may be configured to be in communication with instruments (e.g., GPS, depth gauges) on collecting vessel A, and then configured to automatically obtain collecting vessel A data. In addition, collecting vessel communications device 460 may be part of, or an adjunct to, a GPS transceiver, in communication with satellite 17. Further, the collecting vessel communications devices 460 may be portable, capable of removable installation aboard the collecting vessel A, and may be any suitable computer-based device, for example, a tablet, a laptop, a smart-phone, or the like. As described above, collecting vessel communications devices 460 are in communication with a computer-based communications network 15.

Also in communication with the computer-based communications network 15 is one or more remote computer-based user devices 490A-E and are likewise configured with a user interface and software to allow input into the device of user vessel B data described above and with a communication module to permit at least transmission of user vessel data. Input of the data may be manual. Optionally, the user communications device 490A-D may be configured to be in communication with instruments (e.g., GPS, depth gauges) on user vessel B, and then configured to automatically obtain user vessel B data. In addition, user communications devices 490 may be part of, or an adjunct to, a GPS transceiver, in communication with satellite 17. Further, the user communications devices 490 may be portable, capable of removable installation aboard the user vessel B, and may be any suitable computer-based device, for example, a tablet, a laptop, a smart-phone, personal data assistant (PDA). In another embodiment, the user communications devices 490 may be a desktop computer 490E, and optionally, not installed on user vessel B.

Figure 5:
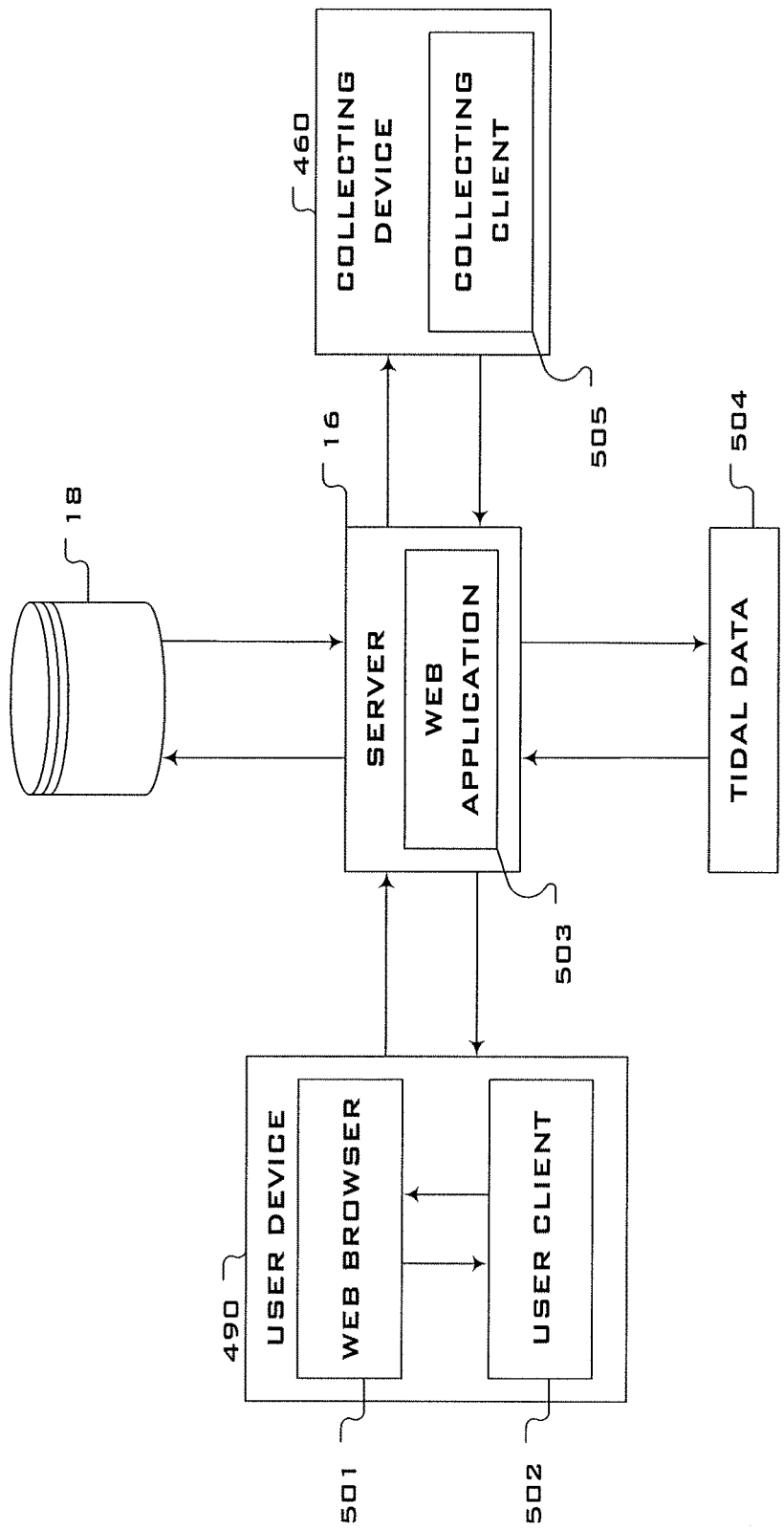
FIG. 5 is a network architecture diagram according to a further exemplary embodiment of the system.
Figure 6:
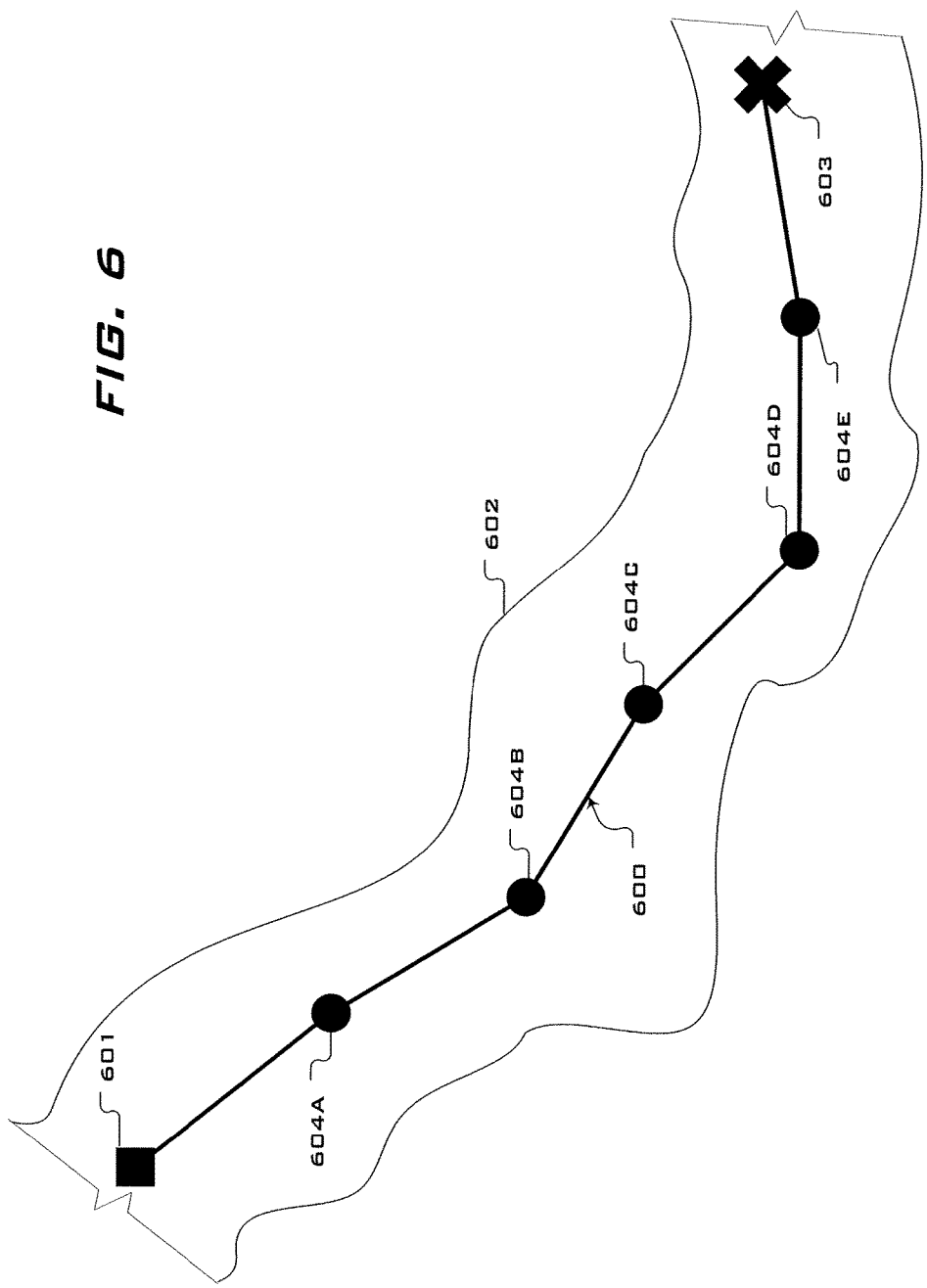
FIG. 6 illustrates an exemplary waterway in which an exemplary embodiment of the system may be used.

With reference to FIG. 5, in one embodiment user communications device 490 is configured with a browser 501, that enables a user, through user device 490 to access information maintained by, and use services provided by, server 16. Browser 501 is an application that enables user device 490 to display and interact with text, images, and other information provided by servers. Browser 501 may be a web browser configured to display web pages (e.g., by using hypertext transfer protocol (HTTP), extended markup language (XML), javascript, etc.). In an alternative embodiment, user device 490 initiates service requests without use of a browser 501.

Server 16 is configured with web application software 503. In this embodiment, server 16 may receive an application service request through network 15 from user device 490. Based on the contents of the application service request, server 16 may determine that web application 503 should perform one or more actions, after which server 16 may return an application service response to the user device 490. Further, web application software 503 is configured to request and retrieve tidal data 504 and to provide the retrieved tidal data to the database 18 to be stored for later use. Additionally, web application 503 is configured to receive collecting vessel data from collecting vessel device 460 and provide the collecting vessel data to the database 18. User device 490 may optionally be configured with user client software 502 responsive to the web browser 501 that can, for example, generate a local graphical user interface (GUI), stores data about the user, e.g., user AD 20, user name, or other identifying data, etc., for prompt retrieval and transmission to the server 16 which may be configured to provide such user data to the database 18. Similarly, the collecting device 460 may also be configured with a collecting client software 505 which may store collecting vessel data such as collecting vessel identification, captain or pilot name, AD 20, etc. Collecting client software 505 may also be configured to retrieve collecting vessel A position data, time, date and, optionally, depth, and transmit such data through network 15 to server 16.

In one embodiment, user device 490 may be configured with user client software 502 that permits a user to access the server 16 web application 503 and provide to the web application 503 a plurality of points, $x_n$, $y_n$, where n is greater than 1. For example, and with reference to FIG. 6, either user client software 502 or web application software 503, may be configured to allow user to input into user device 490 a route 600 in a waterway 602 between a starting point 601 and a destination 603 and comprised of a plurality of waypoints 604a-e, and the expected $T_U$ at which the user expects user vessel B to transit the points. In response, web application 503 may be configured to retrieve KVD data, and tidal data for each of the points, 601, 604a-e, 603 from the database 18. Web application 503 would then determine the DCI for each point, as described above, and transmit KVD and DCI data for each point along the route 600 to user device 490. KVD and DCI data may be displayed through web browser 501, or through user client software 502.

Figure 7A:
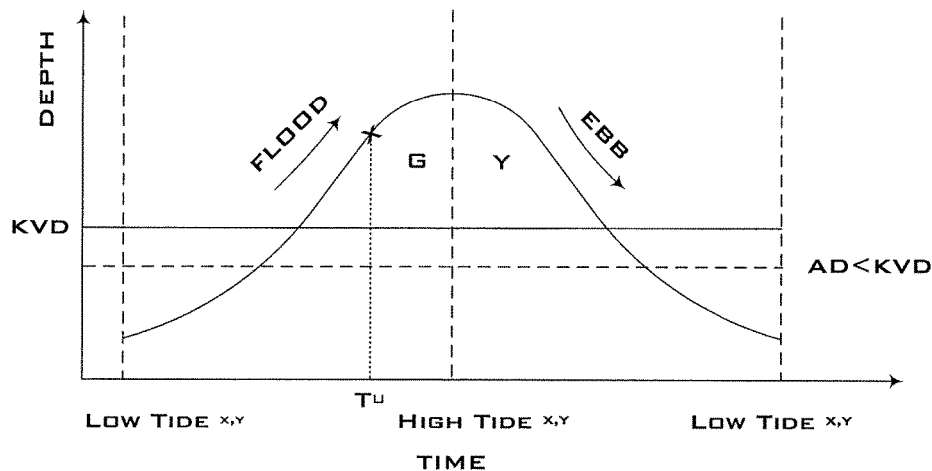
FIGS. 7A and 7B are graphs illustrating conditions that may be indicated by the depth confidence indicator.
Figure 7B:
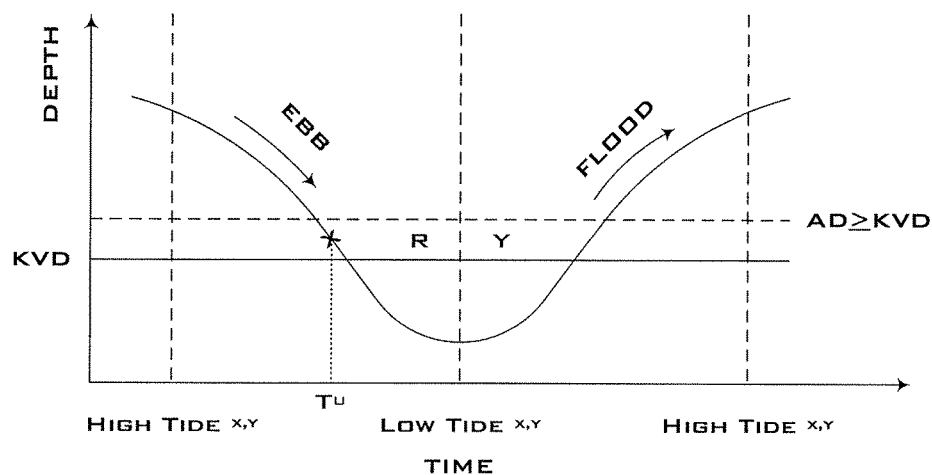

Referring to FIGS. 7A and 7B, one exemplary method of determining DCI, step 304, is illustrated where the predicted tide information for a given location, x, y, is shown graphically. High Tide$_{x, y}$ is the predicted depth of the water at the predicted time for high tide. Conversely, Low Tide$_{x, y}$ is the predicted depth at the predicted time for low tide. In FIG. 7A, it is assumed that AD at TU is less than KVD for that location for illustration purposes. Where $T_U$ falls on the graph during the flood tide G, the KVD value for the user is more reliable and it is more likely that the user vessel B will transit through location x, y without contacting the bottom of the channel. In other words, if the tidal data shows that at $T_U$, the depth is increasing, then it should be clear for a vessel whose AD<KVD to transit and the reliability of DCI is good. In one embodiment, DCI could simply be rendered by a color code, for example, the color green would indicate the KVD to be more reliable as in the above scenario. On the other hand, where $T_U$ occurs during an ebb flow Y, the KVD value for the user is less reliable, or "fair," and transit through x, y should be undertaken with caution. In other words, comparison of $T_U$ with the tidal data indicates that the depth is decreasing. Therefore, even with AD<KVD, transit over location x, y may not be safe. DCI in this circumstance could be indicated by the color yellow.

The opposing case is illustrated in FIG. 7B where it is assumed that AD is greater than or equal to KVD. When $T_U$ occurs during an ebb flow and tidal data indicates the depth is decreasing, DCI reliability is poor and transit through x, y at $T_U$ should be undertaken with extreme caution if not avoided. DCI could be indicated with the color red, in this example. When $T_U$ occurs during a flood flow and depth is increasing Y, the DCI reliability is again fair and could be indicated in this scenario by the color yellow and transit through x, y should be undertaken with caution.

Figure 8:
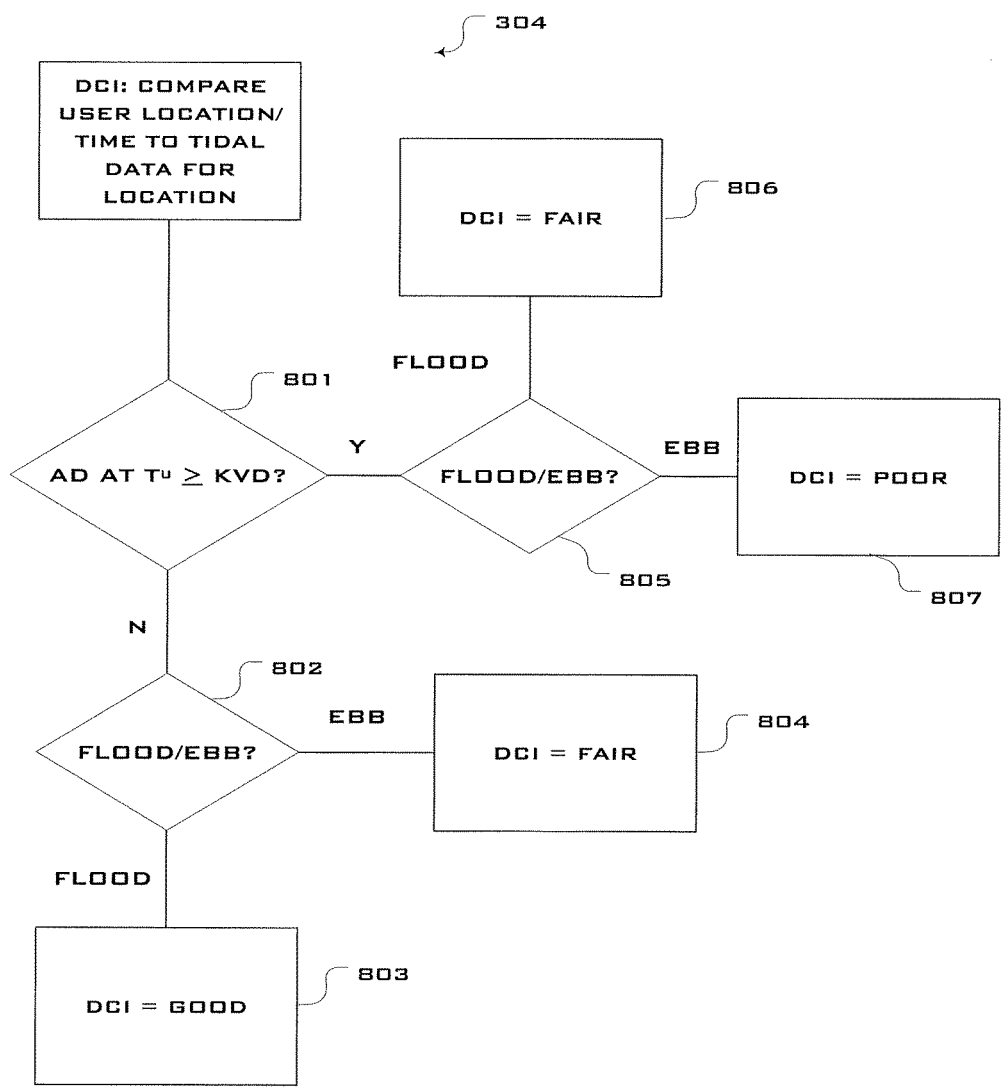
FIG. 8 is a flowchart showing an exemplary process for assessing the depth confidence indicator.

FIG. 8 provides a flowchart of an exemplary logical process that may be performed by the system in one embodiment when it executes step 304, generating DCI. At step 801, AD at time $T_U$ is compared to KVD for location x, y. If the AD is less than to KVD, a determination is made as to whether the flow is flood or ebb at time $T_U$, 802 If the flow is flood, step 803, the system will generated a DCI that means the KVD is reliable to use as to assess whether the user may transit x, y, or a DCI of "good" or "green" or any other positive indication. If the flow is ebb, step 804, the system will generate a DCI that means KVD is to be used with caution, or "fair" or "yellow" or any other non-positive indication. At step 805, it was determined that the AD was greater or equal than KVD then again, a determination is made as to whether the flow is flood or ebb at time $T_U$. If the flow is flood, at step 806, the DCI generated indicates "fair" or "yellow". However, if the flow is ebb, at step 807, the system issues a DCI that indicates "poor" KVD reliability, which may be color-coded as red.

As described above and shown in the associated drawings, the present invention comprises a system and method for communicating near-real time marine navigation information. While particular embodiments have been described, it will be understood, however, that any invention appertaining to the system and method described is not limited thereto, since modifications may be made by those skilled in the art, particularly in light of the foregoing teachings. It is, therefore, contemplated by the appended claims to cover any such modifications that incorporate those features or those improvements that embody the spirit and scope of the invention.

What is claimed is:

1. A system for providing near-real time navigation information comprising:
   a communication network;
   a first communication device coupled to said communication network and configured to transmit collection data obtained from a collecting vessel during transit through a waterway, said collecting vessel having a collecting vessel draft, said collection data comprising a time of collection, geoposition data at time of collection, and said collecting vessel draft;
   a second communication device simultaneously coupled to said communication network and configured to transmit user data obtained from a user vessel, said user vessel having a user vessel draft, said user data comprising a user time at a user geoposition and said user vessel draft;
   a data processing device coupled to said communication network and configured to receive said collection data, store a keel verified depth data for a geoposition in said waterway based upon said collection data, and transmit said keel verified depth data to said second communication device for a user geoposition proximal to said waterway geoposition such that said user vessel is able to utilize said collection data from said collecting vessel in near real time.

2. The system of claim 1, wherein said data processing device if further configured to obtain tidal data relevant to said waterway geoposition and said user time.

3. The system of claim 2, wherein said data processing device is further configured to transmit a depth confidence indication to said second communication device, said depth confidence indication representing a comparison of said user vessel draft to said keel verified depth.

4. The system of claim 1, wherein said data processing device is further configured to transmit excess over-depth data to said second communication device.

* * * * *